PROTECTION CIRCUITS FOR KINESCOPES
Filed Feb. 16, 1968
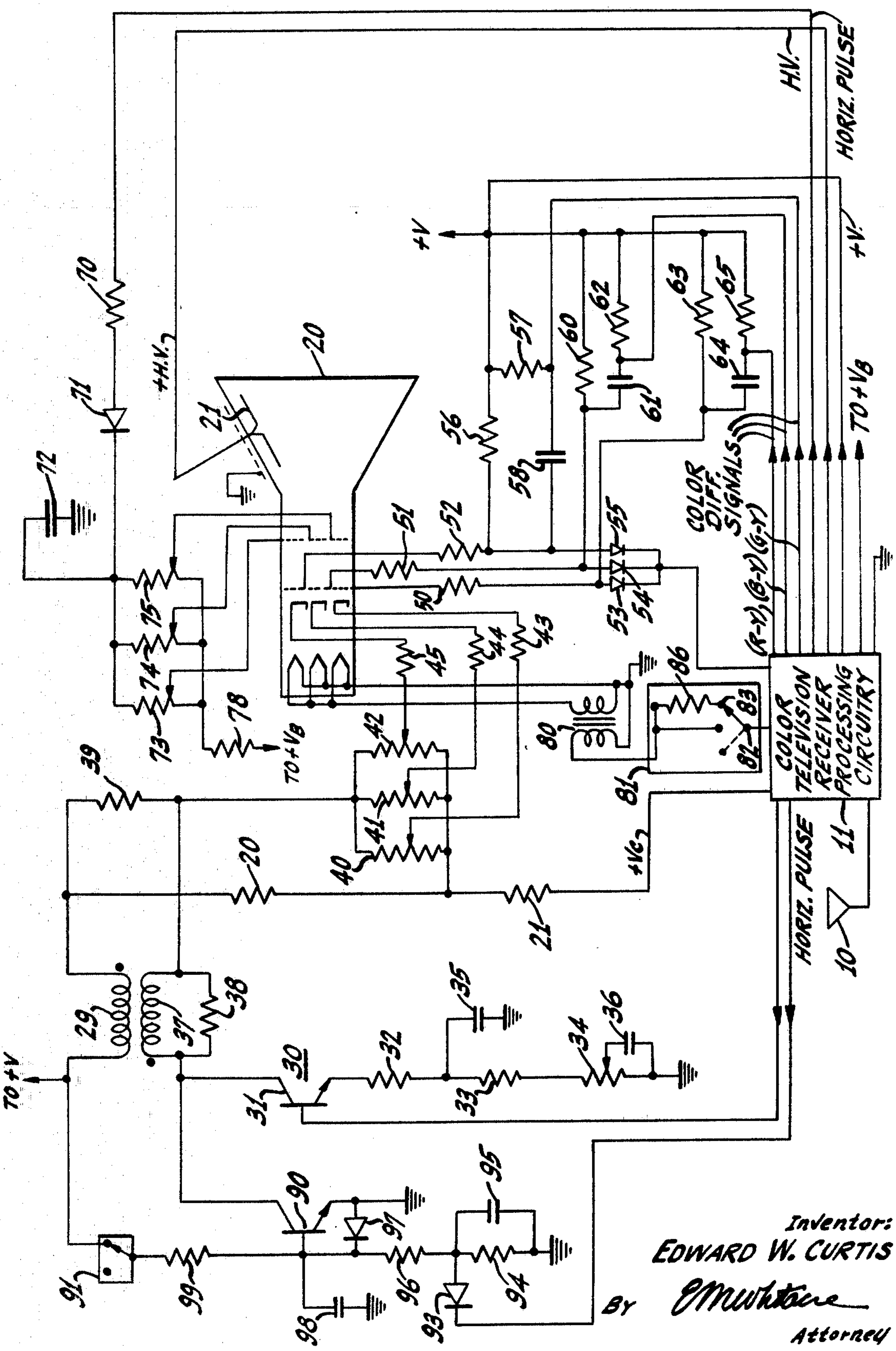
Inventor:
EDWARD W. CURTIS
BY [signature]
Attorney United States Patent Office 3,510,722

Patented May 5, 1970

3,510,722
PROTECTION CIRCUITS OR KINESCOPES

Edward W. Curtis, Indianapolis, Ind., assignor to RCA Corporation, a corporation of Delaware Filed Feb. 16, 1968, Ser. No. 706,015
Int. Cl. H01j 29/52
U.S. Cl. 315—20 9 Claims

ABSTRACT OF THE DISCLOSURE

A television receiver includes a transistor circuit in shunt between a kinescope's cathode and a point of reference potential for rapidly discharging the high voltage stored across the second anode capacitance of the kinescope when the television receiver is deenergized.

This invention relates to television receiver circuitry and more particularly to a protective circuit for a kinescope tube to prevent damage to the fluorescent screen included therein.

In a television receiver or in other apparatus using a cathode ray tube or kinescope having a fluorescent screen with a fairly high brightness capability and a suitable persistence; the screen should be protected from a continuous beam of electrons impinging on the same spot when deflection voltages are removed. Such a continuous beam impingement, even for relatively short periods of time, can destroy the screen's fluorescent capability at the location where this effect occurs. Under normal operating conditions the beam is being continuously and rather rapidly deflected and hence does not remain in a single location for any appreciable length of time preventing damage to the screen.

During normal receiver operation a second anode capacitance formed by conductive layers deposited inside and outside of the glass envelope enclosing the kinescope screen, charges up to a relatively high voltage level. When the receiver is initially turned off the electron emitting cathode is still hot and the electrons emitted thereby will be accelerated towards the screen of the kinescope after the deflection raster has collapsed with a velocity determined by the high voltage stored on the kinescope's second anode capacitance This beam will appear as a bright spot on the face or viewing screen of the kinescope and can burn the screen at that location. In addition, the stored charge or voltage across the kinescope's anode capacitance may remain at a relatively high level for long periods of time after the cathode has finally cooled off and constitutes a shock hazard to the consumer or servicing technician.

In order to prevent kinescope damage and eliminate shock hazard it becomes necessary to either remove the energy stored in the second anode capacitance during the turn-off mode, or else to trigger the kinescope in such a way as to enable it to conduct harder during this mode and hence discharge the anode capacity through the electron beam maintained in the kinescope. However, to remove the charge on the anode capacity at such high voltage levels requires a device with a relatively high voltage capability. One technique is to employ a high voltage resistor, coupled between the kinescope's second anode and a point of reference potential, to afford a discharge path for the kinescope's anode capacity. This approach has the disadvantage that during normal operation there is a continuous drain from the high voltage supply through this resistor which in turn increases the requirements for the receiver's high voltage supply and, in general, serves to increase the power handling requirements of the horizontal deflection components from which this high voltage supply is usually obtained.

Prior art circuits for eliminating this problem in receivers, have used the energy stored in a receiver power supply after turn-off of the receiver to bias off the kinescope while the cathode is being cooled. But in transistor sets in which power is continuously applied to the filaments for fast picture operation, the cathode does not cool off significantly. Furthermore, in television sets incorporating transistors, because of the low impedance of the circuits associated therewith, it may not be feasible to store power supply energy for the time necessary to allow the kinescope cathode to cool. In any case biasing off the kinescope protects the screen from burn damage but does not eliminate the shock hazard as the second anode capacitance still maintains its charge.

In another prior art circuit a positive transient is applied to the grid electrodes to increase the kinescope beam current during receiver deenergization. One problem with this type of circuit is that the introduction of a positive transient at the grid of the kinescope, may produce a current flow from their associated grids, which may damage the kinescope. In addition, the resistance in the current path between the kinescope cathode and the high voltage supply externally of the kinescope may be too great to permit discharge of the second anode during the period in which the raster is collapsing.

Still further the kinescope screen grid electrode voltage falls very rapidly, and may become less positive than the cathode electrode. Thus, the kinescope current to discharge the second anode must flow during this very short period of time, and the amount required may exceed the rating of the electron gun.

Still another prior art technique employs a magnetic relay having a contact which serves to shunt the kinescope's cathode to ground when the receiver is turned off, thereby discharging the anode capacitance. This technique has several apparent disadvantages. One such disadvantage is the relatively lower reliability associated with a relay. Secondly, the voltage levels required to be handled may cause arcing of the relay contact when the high anode capacitance voltage is discharged. Thirdly, during normal receiver operation the relay contact is maintained opened by energizing the relay by means of a magnetic field supplied by a current flowing through a filter choke or inductor in series with the television receiver's power supply. This power supply in turn is normally turned off by the on-off switch. The placement of the relay on or near the inductor becomes critical to assure reliable operation. Furthermore, the power supply furnishing the required magnetic field may have a relatively long time constant associated therewith and hence the relay will not discharge the kinescope's second anode capacity fast enough to prevent damage. The solution to this problem involves the inclusion of extra components and hence further serves to reduce the overall reliability of the circuit.

It is an object of the present invention to provide an improved circuit for the kinescope system of a television receiver which provides complete kinescope anode capacitance discharge immediately after receiver cutoff.

It is another object to provide an improved circuit for discharging the anode capacitance in a kinescope employed in a television receiver capable of fast picture operation.

It is still a further object to provide a circuit to rapidly discharge a kinescope's anode capacitance to thereby eliminate shock hazard while further serving to avoid deficiencies of the systems mentioned above.

According to one embodiment of the present invention, a transistor switch is coupled with its collector to emitter path between the kinescope's cathode and a point of reference potential. The transistor switch is biased off during normal operation of the television receiver. When the television receiver is turned-off, or in a standby or non-operating mode, the base circuit of the transistor is controlled to turn the transistor on to control the kinescope conduction at a variable level to effectively discharge the anode capacity through the collector-to-emitter path of the transistor without damage to the transistor or the kinescope.

The sole figure of the drawings is a schematic diagram partially in block form of a color television receiver embodying the invention.

Referring to the drawings, an antenna 10 receives a transmitted television signal and couples the signals to the input or a radio frequency amplifier included in transistorized color television receiver processing circuitry 11. The television receiver transistor processing circuitry 11 operates on the received signal in a known manner to produce therefrom the requisite synchronization pulses from controlling deflection wave generators which drive a deflection yoke, not shown, on the neck of color kinescope 20, which may be a three gun shadow mask type. In addition, the processing circuitry 11 provides a luminance signal and three color difference signals for application to the appropriate electrodes of the kinescope 20.

Included in the color television receiver processing circuitry 11 is a power supply section, which serves to produce various voltages required by the transistors employed in the receiver and those required by the kinescope 20. In this manner there is shown the leads designated as +HV, +V, $+V_c$ and $+V_b$ emanating from the receiver processing circuitry 11. The lead designated as +HV references the high voltage applied to the second anode 21 of the kinescope 20. This high voltage (+HV) is usually obtained by the rectification of a flyback pulse developed by the horizontal sweep circuitry employed in the receiver.

Another lead designated as +V serves as a B+ supply necessary to apply bias potentials to the video drive circuitry of the receiver. This supply is implemented by the receiver processing circuitry 11 in a conventional manner, such as a full wave rectifier operating from the secondary of a power transformer whose primary winding is coupled to the A.C. line. The +V supply need not be regulated but must be well filtered to prevent the ripple from producing interference in the picture. Other supplies as $+V_c$ and $+V_b$ serve as bias supplies for different purposes in the receiver.

A video output stage 30 comprises a transistor 31, having its base electrode coupled to the luminance processing channel of the color television receiver processing circuitry 11. The luminance signal applied to the base of the video output stage 30 is also commonly referred to in the art as the Y or monochrome signal. The emitter electrode of transistor 31 is returned to ground via a series path comprising resistors 32, 33 and 34. Resistor 32 serves as a degenerative resistor used to linearize the characteristics of the transistor 31 while further serving to provide a suitable bias, together with resistors 32 and 33. Capacitor 35 serves as a high frequency bypass across resistors 33 and 34. Capacitor 36 bypasses a desired portion of resistor 34 to afford gain control to the video output stage 30 and hence acts as a contrast control for the kinescope 20. The collector electrode of the video output stage 30 is coupled through a series path comprising peaking inductor 37 in shunt with damping resistor 38, to the common terminal of three drive potentiometers 40, 41 and 42. The respective variable sliders of the drive potentiometers are coupled to a separate kinescope cathode, associated therewith, through the isolating and current limiting resistors 43, 44 and 45 respectively. Drive adjustments can then be applied independently to each of the three cathodes by means of the potentiometers 40, 41 and 42 through the resistors 43, 44 and 45. The drive range is obtained by resistors 20 and 21 coupled between the +V and $+V_c$ sources and having their junction coupled to the other common terminal of potentiometers 40, 41 and 42. The collector load for transistor 30 is resistor 39 which is connected between the inductor 37 and the +V terminal through a peaking inductor 29. The peaking inductor 29 is mutually coupled to the inductor 27 to provide high frequency compensation for the video output stage 30.

Each of the three kinescope grids, is also separately biased for efficient kinescope operation. The level of bias voltage obtainable at each of the grids of the kinescope 20 is maintained by a clamping arrangement. Each grid is coupled through a respective current limiting resistor 50, 51 and 52 to the anode of a respective diode 53, 54 and 55. The cathodes of the diodes 53, 54 and 55 are connected together and are coupled to the color television processing circuitry 11, which provides a clamping pulse obtained from the horizontal deflection circuitry of the receiver for direct current setting of the kinescope grids at the horizontal or line rate. The junctions between each resistor 50, 51 and 52 and its associated diode 53, 54 and 55 is coupled to a separate biasing and drive network for each kinescope grid. Therefore the junction of resistor 52 and diode 55 is coupled through a resistor 56 to the +V source. A capacitor 58 and an isolating resistor 57 form a series circuit connected across the resistor 56. The combination of resistors 56 and 57, with diode 55 and capacitor 58 act as a peak detector for the pulse obtained from the horizontal deflection circuit. Furthermore the junction between resistors 57 and capacitor 58 serves as a coupling point for the introduction of the color difference signal (R–Y) produced by the color television receiver processing circuitry 11.

Each of the other two grids of the kinescope 20 have similar networks coupled respectively at the junctions of the diode 53, 54 with resistors 50, 51 which respectively comprise resistors 60, 62 and capacitor 61, and resistors 63, 65 and capacitor 64. The junctions between resistor 62 and capacitor 61 is coupled to the processing circuitry 11 for application of the B–Y color difference signal, while the junction between capacitor 64 and resistor 65 serves to accommodate the G–Y color difference signal.

The voltage supply for the three screen electrodes of the kinescope 20 is obtained by applying a horizontal flyback pulse generated by the processing circuitry 11 through a resistor 70 to the anode of a rectifier 71. Rectification of the pulse produces a positive D.C. voltage across filter capacitor 72 coupled between the cathode of rectifier 71 and ground. Application of the voltage to the three screen electrodes of the kinescope 20 is accomplished via the adjustable arms of the screen drive adjustment potentiometers 73, 74 and 75. A suitable bias range is obtained by coupling one terminal of each screen drive adjust potentiometer through a resistor 78 to a bias source indicated as $+V_b$ and generated within the processing circuitry 11.

The filaments of the kinescope 20 are shown, by way of example, as being coupled to the secondary winding of a filament transformer 80. While three filaments are shown in the figure, one filament might actually be used in practice. The primary winding of transformer 80 is coupled to three contacts of a switch 81, which may for example be coupled to, controlled by, or be a part of the television receivers on-off switch. For purposes of explanation, the transformer 80 is shown as having one terminal of its secondary and primary windings grounded.

The contact 82 of the switch 81 is coupled to A.C. line. When the switch 83 is in the left most position there is no A.C. applied to the primary of transformer 80 and hence no power applied to the filaments of the kinescope 20. This would correspond to turning a television receiver off, and as no A.C. line voltage would be coupled to the power supply, the receiver's circuitry would be inoperative. When arm 83 is placed in the center position full power is applied to the filaments of the kinescope and power is also simultaneously applied to the complete receiver, hence the receiver is "on" and operating normally after the filaments warm up. In the third or right hand position of arm 83, power is applied to the kinescope's filaments via a series resistor 86, which limits the current that can flow through and hence the voltage across the kinescope's filaments. In this mode power is removed from all power supplies and all receiver circuitry with the exception of the limited power supplied to the kinescope's filaments. This mode will be referred to as the standby mode. When the receiver switch 81 is placed from the standby mode to the normal on mode, due to the fact that the kinescope's filaments are already warmed up, and the transistor receiver circuitry requires no warm up time, the receiver provides an almost simultaneous picture.

A transistor 90 has its collector electrode coupled to the collector electrode of the video output transistor 31. The emitter of transistor 90 is returned directly to ground or a point of reference potential. Bias for the base electrode of transistor 90 is furnished by a resistor 99 coupled through an interlock 91 to the +V supply. Interlock 91 serves to disconnect the positive base bias for transistor 90 when the horizontal deflection is disabled during a service set-up procedure, thereby avoiding destruction of transistor 90.

The base electrode of transistor 90 is also connected to a negative voltage supply formed by rectifier 93, resistor 94 and capacitor 95. The cathode of rectifier 93 is coupled to the processing circuitry 11 to receive a flyback pulse of suitable amplitude and at the horizontal deflection rate to provide a half wave rectified voltage at the rectifier's 93 anode which rectified voltage is filtered by means of capacitor 95. The negative voltage developed across capacitor 95 is applied to the base electrode of transistor 90, through resistor 96. Coupled between the base and emitter electrodes of transistor 90 is a diode 97, which serves as a clamp and alleviates secondary breakdown of transistor 90 as will be subsequently explained.

Before considering the circuit operation, attention is directed to the relationship between the discharge time constants of the +HV supply, the +V supply, the kinescope grid bias supply, and the kinescope screen grid supply. The longest discharge time constant is in the +HV supply circuit which is primarily discharged by electron beam circuit from the kinescope cathode. Next is the +V supply which has large filter capacitors, not shown, for filtering the ripple components from the rectified line voltages. The discharge time constants of the kinescope control and screen grid supplies are of the same order of magnitude and are much shorter than that of the +V supply. In the present instance, the screen grid supply begins discharging, before the control grid supply when the set is turned off because the pulses applied to the clamp diodes 50, 51 and 52 are regulated in amplitude whereas the pulses applied to the rectifier 71 are not.

The discharge time constant for the circuits associated with the clamping diodes 53, 54 and 55 and the kinescope control grids must be long enough to maintain a substantially constant voltage during a horizontal line interval. It this is not done the picture will be shaded; i.e. vary in brightness in the horizontal direction. A discharge time constant of the order of 10 milliseconds for these circuits subjectively avoids the shading problem.

To understand the problems encountered when the receiver is deenergized, the operation of the receiver will be considered as if the protection circuitry associated with the transistor 90 were not present.

After the receiver has been operating normally for a period of time, the power switch 81 is either turned off, or to the standby position. The second anode or ultor electrode 21 capacitance has a charge which will accelerate electrons from the electron guns of the kinescope to the screen thereof.

Immediately after the set has been turned off, the horizontal deflection voltages begin to collapse. Initially, this causes the kinescope 20 screen voltage to drop, which is in a direction to cut off the three electron beams. The negative voltages applied to the kinescope 20 control electrodes begin to decay after the screen voltages have dropped substantially because of the regulation of the pulses applied to the clamp diode 53, 54 and 55. Any reduction in the negative control grid bias is in a direction to increase the electron beam current, but is counteracted by the reduction in positive screen grid voltages. Meanwhile, because little beam current is flowing, the ultor 21 capacitance remains substantially fully charged.

At some point after the deflection voltages and raster have collapsed, the control grid voltages become sufficiently less negative to permit substantial beam currents. The cathodes will emit or boil off electrons for a period of time after the set has been turned off. The beam currents are accelerated to the screen by the ultor 21 voltage. The electron beams impinge on only a small physical area because the deflection raster has collapsed and can burn and permanently damage the phosphors in that area. These beam currents cease when the cathodes of the kinescope cool sufficiently so that electrons are no longer emitted. Because the ultor 21 capacitance may not be fully discharged, a shock hazard remains for persons servicing the receiver.

In order to air in discharge of the ultor capacitance one could use a larger time constant in the screen electrode of the kinescope. To increase the time constant associated with the screen supply one would have to increase the magnitude of capacitor 72. Capacitor 72 would then have a relatively high value coupled with a relatively high voltage rating and therefore results in an expensive and relatively large physical size component.

The inclusion of the discharge transistor 90, whose collector to emitter path is in shunt with that of the video output stage 30, protects the kinescope 20 and removes the shock hazard. The following sequence of events occur when the receiver is deenergized. The voltage at the base of transistor 90 begins to go positive due to the fact that the horizontal deflection pulse decay rate is much faster than that decay rate of the voltage associated with the +V supply. Hence the base electrode of transistor 90 begins to rise towards the +V supply and reverse biases the diode 97 turning transistor 90 on. As transistor 90 is turned on current begins to flow through resistor 39 in parallel with the series combination of resistor 20 and the parallel combination of resistors 40, 41 and 42. This current then begins to drive the cathodes of the kinescope 20 towards ground thus increasing the forward bias on the electron guns of the kinescope 20.

It will be noted that the kinescope cathode voltage becomes more negative, so does the voltages on the kinescope screen electrodes, thus tending to maintain the potential difference between the screens and cathodes relatively constant. When control grids to cathodes bias reaches a point where substantial beam current starts to flow the ultor 21 capacitance begins to discharge. This action loads the horizontal deflection generator, the voltage from which is still in the process of collapsing and causes a greater rate of collapse. The increased horizontal pulse voltage decay rate causes the voltage at the base electrode of transistor 90 to become more positive, forcing transistor 90 to conduct more heavily causing a further increase in the kinescope 20 current. This regenerative procedure serves to rapidly discharge any high voltage present on the second anode 21 of the kinescope 20. The circuit then affords a fast discharge of the +HV supply before the screen supply is fully decayed and before the deflection raster has collapsed. Thus, the beam discharge energy is distributed over a relatively large area of phosphor screen thereby minimizing the danger of localized damage or burning of the screen of the kinescope 20.

The beam current used to discharge the ultor capacitance is always maintained at a safe operating level in the kinescope which prevents kinescope cathode damage from occurring. This control is afforded by transistor 90 which controls the voltage at the kinescope's cathode in a direction to assure maximum safe operating current in the kinescope as a function of the voltage then present on the ultor capacitance. Hence as the voltage on the ultor capacitance decreases the transistor 90 becomes more saturated and can draw more current through its collector to emitter path, while the variation in the impedance of the collector to emitter path of transistor 90 serves to maintain safe current conduction through the kinescope during this rapid discharge cycle.

Coupled with these advantages is the fact that the kinescope beam current is continuously maintained at a safe level as is the dissipation of transistor 90. Initially when a large voltage is stored by the ultor 21 capacity, the conduction through the transistor 90 is maintained relatively low. As the voltage across the ultor capacity decreases more current is drawn still maintaining safe dissipation in the kinescope.

The diode 97 serves to provide multiple functions. In the normal operating mode the on mode of the receiver, the diode 97 limits the voltage swing at the base of transistor 90 in the negative direction which prevents the base to emitter junction of transistor 90 to be operated in a reverse breakdown mode. This is desired as reverse breakdown operation would tend to lower the power rating of transistor 90 while at the same time serve to decrease the voltage breakdown. Furthermore diode 97 serves to improve the overall temperature operation of the circuit by lowering the effective base impedance of transistor 90 during normal receiver operation. In addition the saturation of diode 97 during the normal on mode of the receiver affords some time delay during the off transient between the beginning of horizontal decay and the start of conduction in transistor 90. This built in delay allows the +V supply to decay slightly thereby reducing the peak power requirements of transistor 90.

A typical embodiment of the invention as shown in the figure includes the following components.

Resistors:
- 20, 39—4700 ohms
- 21—68,000 ohms
- 32, 33—47 ohms
- 34—350 ohms( variable)
- 38—10,000 ohms
- 40, 41, 42—7,500 ohms
- 50, 51, 52—1,000 ohms
- 56, 60, 63—2,200,000 ohms
- 73, 74, 75—1,500,000 ohms
- 78—180,000 ohms
- 70—10,000 ohms
- 99, 94—100,000 ohms
- 96—12,000 ohms Inductors 37, 29—RCA #1471927-1

Capacitors:
- 58, 61, 64—.01 microfarad
- 35—470 micromicrofarads
- 36—30 microfarads
- 72—.02 microfarad
- 98—.1 microfarad Diodes:
- 93, 53, 54, 55—RCA#1471872-1
- 97—50 P1V silicon
- 71—1500 P1V Transistors:
- 90—2N3440
- 31—RCA #1473584
- +HV—+25 kv.
- +V—+255 volts
- $+V_b$—+155 volts
- $+V_c$—+30 volts Resistors:
- 43, 44, 45—1,000 ohms
- 57, 62, 65—10,000 ohms Capacitor:
- 95—.01 microfarad

What is claimed is:

1. In a television receiver of the type having a kinescope with cathode and control grid electrodes and an ultor electrode having an associated capacitance;

vertical and horizontal deflection wave generating means for driving beam deflection means associated with said kinescope to cause a raster to be scanned on the screen of said kinescope;

high voltage supply means associated with said horizontal deflection wave generating means for developing an energizing voltage for said ultor electrode;

power supply means for supplying operating voltage to said receiver;

and control means for energizing and deenergizing said receiver power supply means, a protection circuit for discharging the energizing voltage stored in the capacitance associated with said ultor electrode before said raster collapses when said receiver is deenergized by said control means comprising:

(a) an active device having a first non-operating mode in which it presents a substantially high impedance level and a second mode in which its impedance can be varied from said substantially high impedance level to increasingly lower impedance levels, (b) means coupling said active device between said kinescope's cathode and a point of reference potential, (c) means for biasing said active device in said first mode during said receiver's energization, and for operating said device in said second mode during said receiver's deenergization wherein said active device serves to discharge said ultor capacitance in accordance with said increasingly lower impedance levels.

2. A circuit for discharging a cathode ray tube having a cathode and a second anode, said second anode having a capacitance which is charged to a high potential during a display producing mode, comprising:

(a) variable impedance means coupled between said cathode of said cathode ray tube and a point of reference potential, (b) means coupled to said variable impedance means responsive to the termination of said display producing mode for continuously decreasing said variable impedance means according to said potential stored on said second anode capacitance.

3. A protection circuit for cathode ray tubes of the type having a viewing screen, a cathode and a second anode, said second anode having a capacitance associciated therewith which capacitance is charged to a high potential during operation whereby a display is caused to appear on said viewing screen, a circuit for rapidly discharging said capacitance when said cathode ray tube is deenergized comprising:

(a) a voltage responsive impedance element operable between a first non-conductive condition when said cathode ray tube is energized, and a second conductive condition when said cathode ray tube is deenergized, (b) means coupling said voltage responsive impedance element between the cathode of said cathode ray tube and a point of reference potential, (c) control means for energizing and deenergizing said cathode ray tube, (d) means responsive to the energization of said cathode ray tube for maintaining said variable impedance element in said first non-conductive condition, and further responsive to the deenergization of said cathode ray tube for controlling the conductivity of said impedance element in said second conductive condition.

4. In a television receiver, employing transistor circuitry, said receiver being operative to produce a substantially simultaneous display on the viewing screen of a kinescope employed therein, upon switching said receiver from a fast picture mode to an operating mode, said kinescope having a cathode and a second anode capable of supporting a beam of electrons therebetween at a maximum specified current density, said second anode having a capacitance which is charged to a high potential by a power source during said operating mode, said capacitance undesireably retaining said charge during said fast picture mode, a circuit for discharging said capacitance when said receiver is switched from said operating mode to said fast picture mode, comprising:

(a) a transistor having a base, collector and emitter electrode, (b) means coupling said transistor's collector to emitter path between said cathode ray tube's cathode and a point of reference potential, (c) means coupled to said transistor's base electrode responsive to said receiver being switched from said operating mode to said fast picture mode to decrease said collector to emitter impedance between said cathode ray tube's cathode and said point of reference potential in a direction not to exceed said maximum specified current density.

5. In a television receiver having a kinescope with a cathode and an anode electrode between which an electron beam can flow, said anode having a capacitance which is charged to a high potential during normal operation of said television receiver, said capacitance's potential serving undesireability to maintain said electron beam flow between said anode and cathode during a non-operating mode, a circuit for discharging said capacitance when said receiver is placed in said non-operating mode comprising:

(a) a transistor having a base, emitter and collector electrode, (b) means coupling said transistor's emitter to collector path between said kinescope's cathode electrode and a point of reference potential, (c) means coupled to said transistor's base electrode responsive to said receiver being placed from said operating to said non-operating mode to cause the impedance of said transistor's emitter to collector path to decrease and therefore the impedance from said kinescope's cathode electrode to said point of reference potential to decrease in accordance with the magnitude of said charge on said kinescope's anode capacitance whereby said anode capacitance is discharged through said transistor's collector to emitter path solely during said non-operating mode.

6. The apparatus according to claim 5 wherein said transistor is a NPN type.

7. In a television receiver having a kinescope with a cathode and anode electrode, said receiver including deflection circuitry having a specified turnoff delay associated therewith when said receiver is placed from a picture producing mode to a non-picture producing mode, said deflection circuitry further serving to provide during said picture producing mode a high voltage for said kinescope's anode, said anode of said kinescope having a capacitance which charges to said high voltage and undesireably tends to maintain said charge when said receiver is placed in said non-picture producing mode, a discharge circuit for said kinescope comprising:

(a) a transistor having a base, emitter and collector electrode, (b) means for coupling said transistor's collector to emitter path between said kinescope's cathode and a point of reference potential, (c) means coupled to said transistor's base electrode responsive to said deflection circuitry's turnoff delay to decrease said transistor's collector to emitter path impedance according to the magnitude of said high voltage maintained by said kinescope's anode capacitance, said impedance decrease serving to load said deflection circuitry in a direction to decrease said specified turnoff delay whereby said capacitance discharged through said decreased emitter to collector impedance path at a rate determined by said decreased turnoff delay.

8. The apparatus according to claim 7 wherein said means coupled to said transistor's base electrode includes a half wave rectifier circuit coupled to said deflection circuitry and capable of providing a negative potential serving to maintain said transistor cutoff during said picture producing mode.

9. In combination:

(a) a kinescope having a cathode, grid, screen and second anode electrode, (b) a source of video signals, (c) means coupled to said kinescope's cathode electrode responsive to said video signals for driving said cathode, (d) means coupled to said grid electrode for maintaining said grid at a specified potential with respect to said cathode, said means having a first given time decay associated therewith which decay determines the time over which said grid can maintain said specified potential, (e) means coupled to said screen electrode for maintaining said screen at a specified higher potential than said grid potential with respect to said cathode, said means having a second time decay of the order of magnitude of that associated with said means coupled to said grid, said time decay determining the time over which said screen can maintain said specified higher potential, (f) means coupled to said second anode electrode for maintaining said second anode at a specified still higher potential than said screen potential, said second anode having a capacitance associated therewith which capacitance charges to said specified higher potential present at said second anode, (g) means coupled between said kinescope's cathode and a point of reference potential to provide therebetween a controllable variable impedance.

(h) means coupled to said above means for controlling said variable impedance in a direction to decrease said impedance's magnitude at a rate which is faster than said first and second time decays whereby said second anode's capacitance is discharged through said decreased impedance while said means coupled to said grid and screen are still serving to maintain at least a portion of said specified and said specified higher potentials.

References Cited

UNITED STATES PATENTS

| | | | |
|---|---|---|---|
| 2,638,562 | 5/1953 | Schipper et al. | 315—20 |
| 3,112,425 | 11/1963 | Theisen. | |

RICHARD A. FARLEY, Primary Examiner

B. L. RIBANDO, Assistant Examiner